May 3, 1927.  1,627,219
R. R. WHITE
PIPE CONNECTION
Filed May 5, 1924
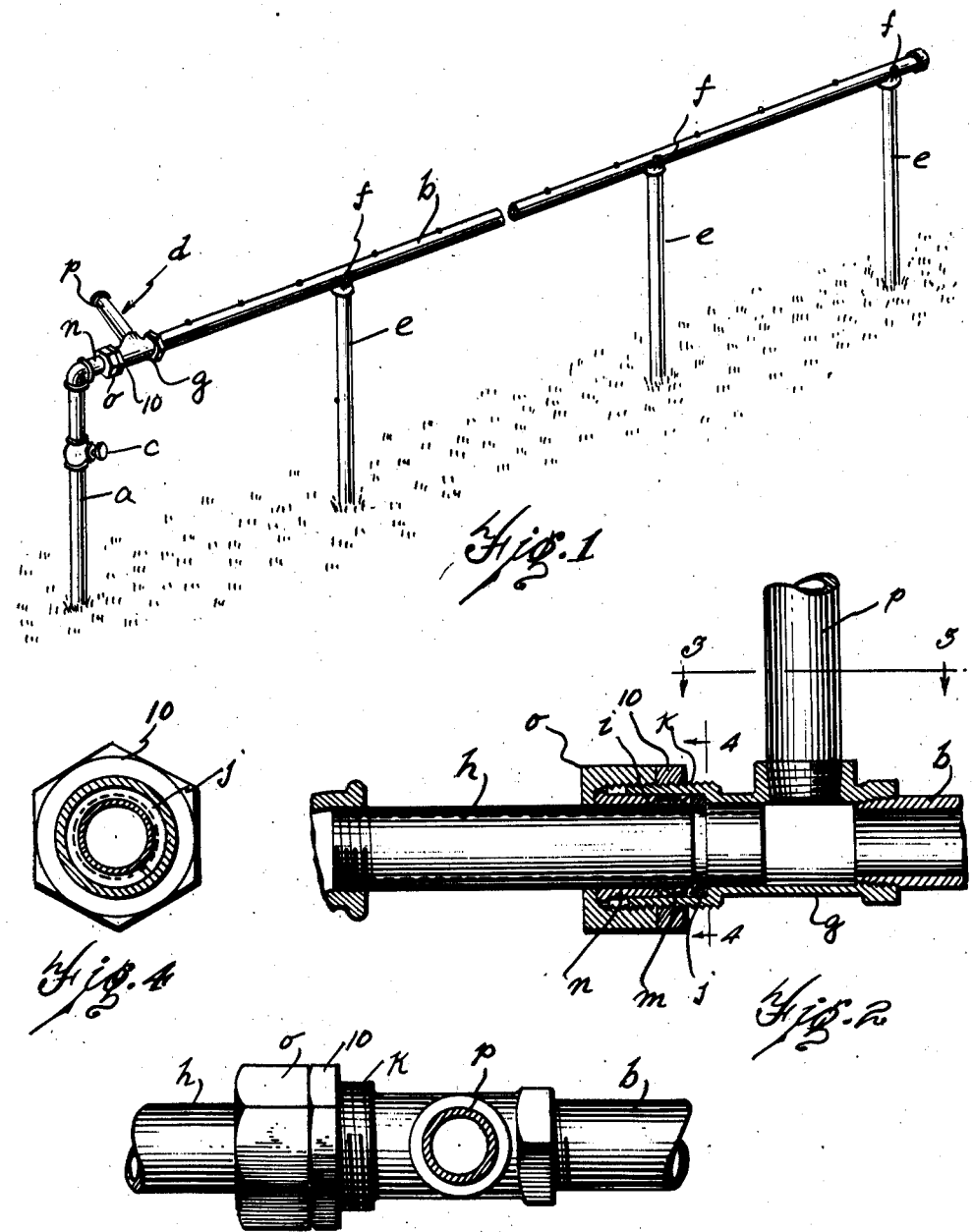
INVENTOR.
Raymond R. White
BY
Stuart C. Barnes
ATTORNEY.

Patented May 3, 1927.

1,627,219

UNITED STATES PATENT OFFICE.

RAYMOND R. WHITE, OF DETROIT, MICHIGAN, ASSIGNOR TO WHITE SHOWERS, INC., OF DETROIT, MICHIGAN, A CORPORATION OF MICHIGAN.

PIPE CONNECTION.

Application filed May 5, 1924. Serial No. 711,294.

This invention relates to a pipe connection for a liquid distributing system or overhead irrigation system. In such an apparatus there is generally used a relatively long distributing pipe that is provided with a series of nozzles, the said pipe being rotatably supported on a plurality of standards. Sometimes it is desirable to turn this distributing pipe about its longitudinal axis for the purpose of directing the water spray so that the ground will be properly irrigated. This long pipe is connected to a stationary water main by a swiveling coupling or what I term a turning union. This enables an operator to turn to any desired position without loosening the connection between the supply pipe and the water main.

Another object of this invention is the provision of means whereby the packing may efficiently seal the joint and relieve the end of the rotating distributing pipe from sealing against the packing, the joint being sealed near the end of the pipe and preventing any of the packing from falling into the interior of the distributing pipe, as it is quite necessary to prevent any of the packing or other foreign matter from entering the supply pipe, for this would tend to clog the nozzle openings. The construction of my connection is such that the turning union is provided with a bearing in which the stationary pipe or nipple is fitted thereby allowing the turning union to rotate about this nipple without interfering with the packing that seals the joint.

In the drawings:

Fig. 1 is a perspective view of a liquid distributing system having my turning union installed therein.

Fig. 2 is a longitudinal sectional view taken through the turning union.

Fig. 3 is a sectional view taken on the line 3—3 of Fig. 2.

Fig. 4 is a sectional view taken on the line 4—4 of Fig. 2.

$a$ designates the main supply pipe and the flow of water from the said main to the auxiliary distribution or irrigating pipe $b$ is controlled by a valve $c$. A suitable pipe connection designated as a whole by $d$, is interposed between the stationary pipe secured to the water main, and the distributing pipe $b$ which is adapted to be rotated about it longitudinal axis. A plurality of standards $e$ are provided with suitable bearings $f$ for supporting the rotating pipe $b$.

My pipe connection comprises a T which serves as a turning union. This turning union is designated $g$ and the distributing pipe $b$ is adapted to be screwed or otherwise secured to one end of this turning union. The other end of the turning union is much longer and is provided with a larger bore at the end thereof and a short section of pipe or nipple $h$ is fitted into this end of the union, the extreme end of the nipple $h$ extending into that portion of the union which has a narrower bore, thereby rotatably supporting the T or turning union $g$. The other end of the pipe section or nipple $h$ is permanently secured to the water main $a$.

The nipple is provided with a circumferential groove $i$ near the end thereof and a split spring collar $j$ is fitted into this groove. On examining Fig. 2 it will be seen that this split collar engages the shoulder formed in the turning union by counter-boring the end of the union which provides the enlarged bore in the end thereof. This end of the turning union is externally threaded as at $k$. Packing $m$ is inserted about the section $h$ behind the collar $j$ and a packing gland $n$ is fitted into the enlarged end of the union. A packing nut $o$ and a lock nut 10 are screwed down on the external threads of the union and the packing nut rams the packing gland $n$ against the packing, thereby squeezing the packing between the collar and the packing sleeve and forming an efficient seal for the joint.

This construction successfully seals the joint and prevents the possibility of any of the packing from escaping into the interior where it may be carried into the irrigation pipe $b$. The handle $p$ is secured to the turning union, whereby the operator may rotate the union and the irrigation pipe carried thereby to any desired position.

What I claim is:

In a pipe connection for a liquid distributing system, the combination of a turning union provided at one end with means for securing a distributing pipe thereto and having the opposite other end externally threaded and provided with a bore which is enlarged at the end thereof, means for turning the union together with the distributing pipe on the longitudinal axis of the pipe, a second pipe fitted into the bore carried by the turning union to rotatably support the same to permit the rotation of the distributing pipe, the said second mentioned pipe provided with a circumferential groove near the end thereof, a split metallic spring collar fitted in said groove and arranged to engage the shoulder formed by the enlarged bore, that portion of the pipe beyond the groove engaging in the narrow portion of the bore, packing engaging behind the spring collar and within the enlarged bore portion of the union, a packing gland fitted into the enlarged bore and engaging the packing, a packing nut screwed onto the external threads carried by the union and engaging the packing gland to squeeze the packing between the split spring collar and the gland and force the packing against the side walls of the enlarged portion of the turning union for sealing the joint.

In testimony whereof I have affixed my signature.

RAYMOND R. WHITE.